(No Model.)

G. E. DANFORTH.
CLASP OR FASTENING FOR GLOVES, &c.

No. 294,019. Patented Feb. 26, 1884.

Witnesses.
G. B. Maynadier,
J. R. Snow.

Inventor
George E. Danforth,
by J. E. Maynadier
Atty

UNITED STATES PATENT OFFICE.

GEORGE EDWIN DANFORTH, OF CHELSEA, MASSACHUSETTS.

CLASP OR FASTENING FOR GLOVES, &c.

SPECIFICATION forming part of Letters Patent No. 294,019, dated February 26, 1884.

Application filed December 14, 1883. (No model.)

*To all whom it may concern:*

Be it known that I, GEORGE EDWIN DANFORTH, of Chelsea, in the county of Suffolk and State of Massachusetts, have invented a new and useful Clasp or Fastening, of which the following is a specification.

My invention relates to clasps more especially intended for fastening gloves and shoes, but equally applicable whenever two pieces of flexible material are to be joined together.

My invention consists in a fastening in two parts, one part having a grooved flange at each end, and the other part flat. The two parts are capable of being joined together to form a fastening, as hereinafter described, reference being had to the accompanying drawings, in which—

Figure 1:
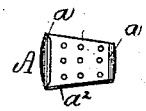
Figure 2:
Figure 3:
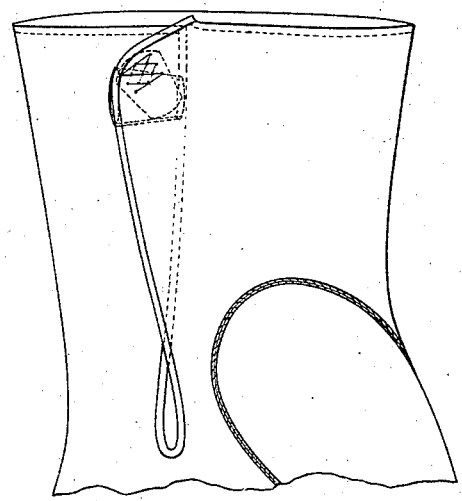
Figure 4:
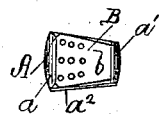

Figure 1 represents the flanged part, and Fig. 2 the flat part. Fig. 3 shows the two parts fast to the opposite sides of the slit in a glove, with the end of the flat part inserted in the grooved flange of the other part; and Fig. 4 shows the two parts joined together.

The flanged part A is preferably curved at both ends from centers in the middle of the opposite ends, the radii of both curves being equal to the greatest distance between the flanges. The flanges $a$ $a'$ are bent over to form grooves. The flat part B has both of its ends curved from the same center, which is a point in the middle of the piece. The part B is attached to the part A by inserting one of its ends in one of the flanges of the part A, and then turning it until its other end comes under the other flange of the part A. It is evident that when so connected the two parts cannot be separated, except by a strain tending to turn the part B within the part A. Usually the strains do not have this tendency; but when the clasp is so placed as to be subject to such a strain a suitable stop—such as a flange, $a^2$, formed by turning up the edge of the part A—is provided, and the part B is then inserted from one side. The part A is placed so as to have its stop $a^2$ on the side toward which the strain tends to turn the part B, so as to prevent the part B from becoming detached from the part A. The part A is fastened to the outside of one of the two pieces to be joined together. The part B is fastened to the inside of the other of these two pieces, so as to leave about one-half of it free. The free end of part B is inserted in one of the flanges of part A, and part B turned until its other end comes under the other flange of part A, thereby so fastening the two pieces together that they can be separated only by turning the part B.

In a glove the fastening next to the hand is best made with the free end $b$ of the flat part arranged to enter the flange on the part A from the side farthest from the hand, so that the movements of the hand cannot turn the part B and loosen the fastening. In the other fastenings on the same glove the free end of part B enters the flange on the side next the hand.

For fastening shoes the free end of part B should enter the flange on the side nearest the toe, since I find that the motion of the foot tends to turn the flat part toward the ankle.

I claim as my invention—

A clasp or fastening for gloves, shoes, &c., consisting of the two parts A and B, the part A having a grooved flange at each end, as described, and the part B adapted to be inserted under the end flanges to close the clasp, the parts each having suitable means for attachment to the glove or shoe, all substantially as set forth.

GEORGE E. DANFORTH.

Witnesses:
W. A. COPELAND,
JOHN R. SNOW.